United States Patent [19]

Adrian et al.

[11] Patent Number: 5,344,219
[45] Date of Patent: Sep. 6, 1994

[54] MOTOR VEHICLE WHEEL FRAME

[75] Inventors: Christian A. Adrian; Robert Speth; William G. Angus, all of Pretoria, South Africa

[73] Assignee: CSIR, Pretoria, South Africa

[21] Appl. No.: 964,939

[22] Filed: Oct. 22, 1992

[30] Foreign Application Priority Data

Oct. 24, 1991 [GB] United Kingdom ............ 9122593.8

[51] Int. Cl.$^5$ .............................................. B60B 1/00
[52] U.S. Cl. ..................... 301/64.1; 301/64.2; 301/104; 301/105.1
[58] Field of Search ............. 301/64.1, 64.2, 64.7, 301/104, 105.1

[56] References Cited

U.S. PATENT DOCUMENTS

| | | | |
|---|---|---|---|
| 1,102,193 | 6/1914 | Horn et al. | 301/64.2 |
| 1,613,127 | 1/1927 | Reyneri | 301/64.2 |
| 3,357,747 | 12/1967 | Eldred . | |
| 3,862,779 | 1/1975 | Jayne | 301/64.2 |
| 4,358,162 | 11/1982 | Schneider et al. . | |
| 4,527,839 | 7/1985 | Fujitaka et al. . | |
| 4,995,675 | 2/1991 | Tsai . | |

FOREIGN PATENT DOCUMENTS

| | | | |
|---|---|---|---|
| 0089809 | 9/1983 | European Pat. Off. . | |
| 0368480 | 5/1990 | European Pat. Off. . | |
| 3620097 | 12/1987 | Fed. Rep. of Germany | 301/64.7 |
| 472051 | 11/1914 | France | 301/64.2 |
| 265222 | 6/1929 | Italy | 301/64.2 |
| 244340 | 12/1925 | United Kingdom . | |
| 885675 | 12/1961 | United Kingdom . | |

*Primary Examiner*—Russell D. Stormer
*Attorney, Agent, or Firm*—Harness, Dickey & Pierce

[57] ABSTRACT

A motor vehicle wheel frame 10 is in the form of an assembly including three main components 12, 14, 30 of fiber-reinforced synthetic plastics molded material and a pre-assembled hub 32. First and second members 12, 14 are mirror images. Each includes a circular band portion 16, 18; a plurality of spoke portions 20, 22, extending inwardly from the band portions; and hub mounting arrangements 24, 26 in the form of an inner peripheral flanges at inner ends of the spoke portions. The first and second members are closed on each other to form an outer, circular, outwardly concave band 28, a plurality of hollow spokes and the hub mounting formations in opposed arrangement. The third main component is a rim 30 seated in the concave band 28 and adapted to seat a tire. The hub 32 is received intermediate the hub mounting formations. The three main components and the hub are assembled together and bonded together by suitable resinous adhesives.

10 Claims, 5 Drawing Sheets

MOTOR VEHICLE WHEEL FRAME

This invention relates to a motor vehicle wheel frame, i.e. a frame of a road wheel for a mechanically powered vehicle or motor vehicle. It relates also to a method of manufacturing such a motor vehicle wheel frame.

For purposes of this specification, the term "wheel frame" shall be used to denote a portion of a tired road wheel without the tire, i.e. that portion of the wheel which is colloquially (but incorrectly) referred to as a "rim".

The invention is expected to be particularly advantageously applicable to motorcycle wheels.

In accordance with a first aspect of the invention, there is provided a method of manufacturing a motor vehicle wheel frame, the method including molding separate, complemental, first and second, members of a fiber-reinforced synthetic plastics material, each member being integral and comprising an outer, circular, band portion, a plurality of spoke portions respectively of concave section and extending inwardly from the band portion, hub mounting formations at inner ends of the spoke portions and adapted for use in mounting components which will form a hub in use, the first and second members being configured to be closable on each other in oppositely orientated arrangement to form an outer, circular, outwardly concave band, a plurality of hollow spokes and opposed hub mounting formations;

molding an integral circular rim of a fiber reinforced synthetic plastics material, said rim being complemental to said outwardly concave band for seating peripherally in said outwardly concave band and said rim being of a size and shape to seat a tire in use;

providing complemental components for forming a hub; and assembling the wheel frame by bonding the first and second members together, the rim being seated in and bonded to the outwardly concave band portion and the components for forming a hub being seated in and bonded to the hub mounting formations.

Bonding of the rim to the concave band may be along outer peripheral edges of the assembly and at least intermittently along a bottom of said concave band, the concave band and the rim being configured to fit snugly in said areas bonded together.

The first and second members may advantageously interface in a plane. This is conducive to achieving tight manufacturing tolerances. It is also conducive to a neat appearance.

Bonding of the first and second members may include bonding respectively the first and second members to internal lip members shaped and arranged internally of the first and second members to overlap an interface of the first and second members.

Bonding of the components for forming a hub to the hub mounting formations may include peripherally overlapping radially outer, peripheral, portions of sides of the hub by means of the hub mounting formations and causing bonding in said overlapping regions.

The invention, in accordance with a second aspect, extends to a motor vehicle wheel frame comprising complemental first and second members, each being of separate, integrally molded, construction of fiber reinforced synthetic plastic material and comprising an outer, circular, band portion, a plurality of spoke portions respectively of concave section, and integral with and extending inwardly from the band portion, hub mounting formations at inner ends of the spoke portions, the first and second members being closed upon and bonded to each other in oppositely orientated arrangement such as to form an outer, circular, outwardly concave band, a plurality of hollow spokes and such as to position the hub mounting formations oppositely to each other;

a molded, integral, circular rim of fiber-reinforced synthetic plastic material seated in and bonded to said outwardly concave band and adapted to seat a tire in use; and hub components forming a hub and which are seated in and bonded to the hub mounting formations.

A bottom of the outer band may be interrupted at regions corresponding to the positions of the spokes.

The rim may be bonded to the concave band along outer peripheral edges of the assembly and along said bottom of the concave band, the rim and the concave band being configured to fit snugly.

The wheel frame may include internal lips arranged internally of the first and second members in internally overlapping arrangement with and bonded to edge regions of the spoke portions.

The components forming a hub may comprise opposed side flanges forming sides of the hub and providing seats for wheel bearings, and a barrel interconnecting the side flanges. The side flanges may be of metal and may have apertures to receive complemental studs or bolts. The side flanges may be in the form of spiders, i.e. scalloped intermediate the positions of the apertures, to save mass.

The barrel may be in the form of a molding or extrusion of synthetic plastics material, discs being provided co-axially adjacent to and bonded to the side flanges and providing peripheral seats on which ends of the barrel are seated and bonded. This enhances attachment of the barrel to the side flanges. The discs may be of a synthetic plastics material, and may be apertured in register with the apertures of the flanges, bushes being provided in said apertures of the discs. The discs may be provided integrally with respectively the first and second members and may form the or may form part of the hub mounting formations.

Instead, the discs may be separate and may be included in the components forming the hub.

The invention is now described by way of example with reference to the accompanying diagrammatic drawings. In the drawings FIG. 1 shows, fragmentarily, in side view, a wheel frame in accordance with the invention;

Figure 1:
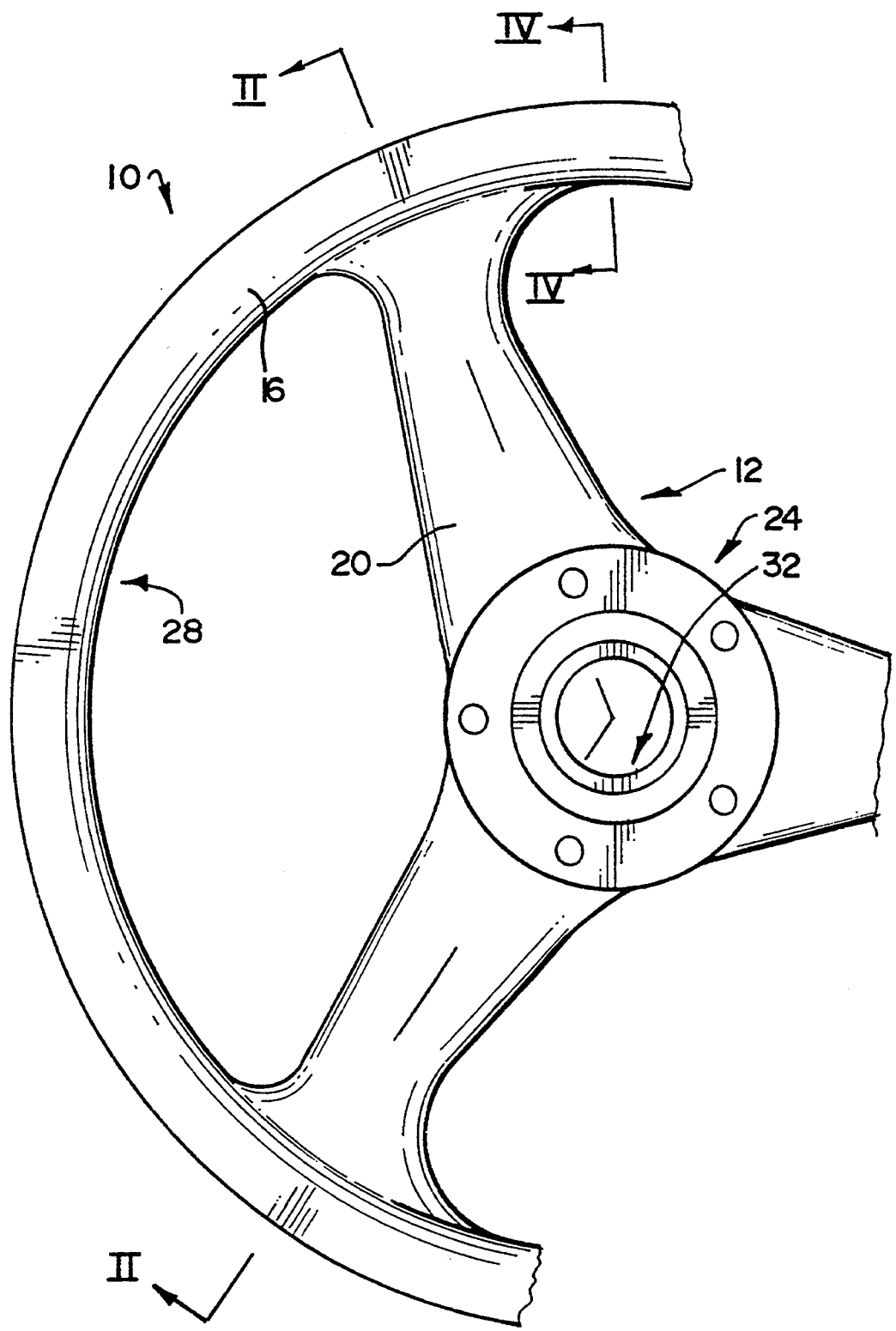

With reference to FIG. 1 of the drawings, a wheel frame for a motor cycle in accordance with the invention is generally indicated by reference numeral 10. The wheel frame 10 is suitable for a high speed track racing motor cycle such as a Grand Prix motor cycle. Thus, the wheel frame 10 is of very light construction so as to reduce the mass of the motor cycle generally, and more specifically the unsprung mass of the motor cycle.

The components of the wheel frame are generally of a synthetic plastics composite material more specifically a fiber reinforced synthetic plastics material such as carbon fiber reinforced synthetic plastics material. All of the synthetic plastics composite components are of molded construction and attachment of the components to one another is by way of bonding with resinous adhesives. However, a limited number of selected components in a hub of the wheel frame 10 may be of a light metal such as aluminum or aluminum alloy. Selected components may be of steel, e.g. stainless steel.

Care will be taken to prevent or limit corrosion of the aluminum or aluminum alloy components. Those components may be treated to render them resistant to corrosion, e.g. by anodizing them. They may be insulated from carbon containing material, e.g. by means of a suitable bonding agent or adhesive.

The wheel frame 10 comprises first and second members of which only the first member 12 can be seen in FIG. 1. The first and second members are generally mirror images of each other and will be described in more detail with reference also to FIG. 2.

Figure 2:
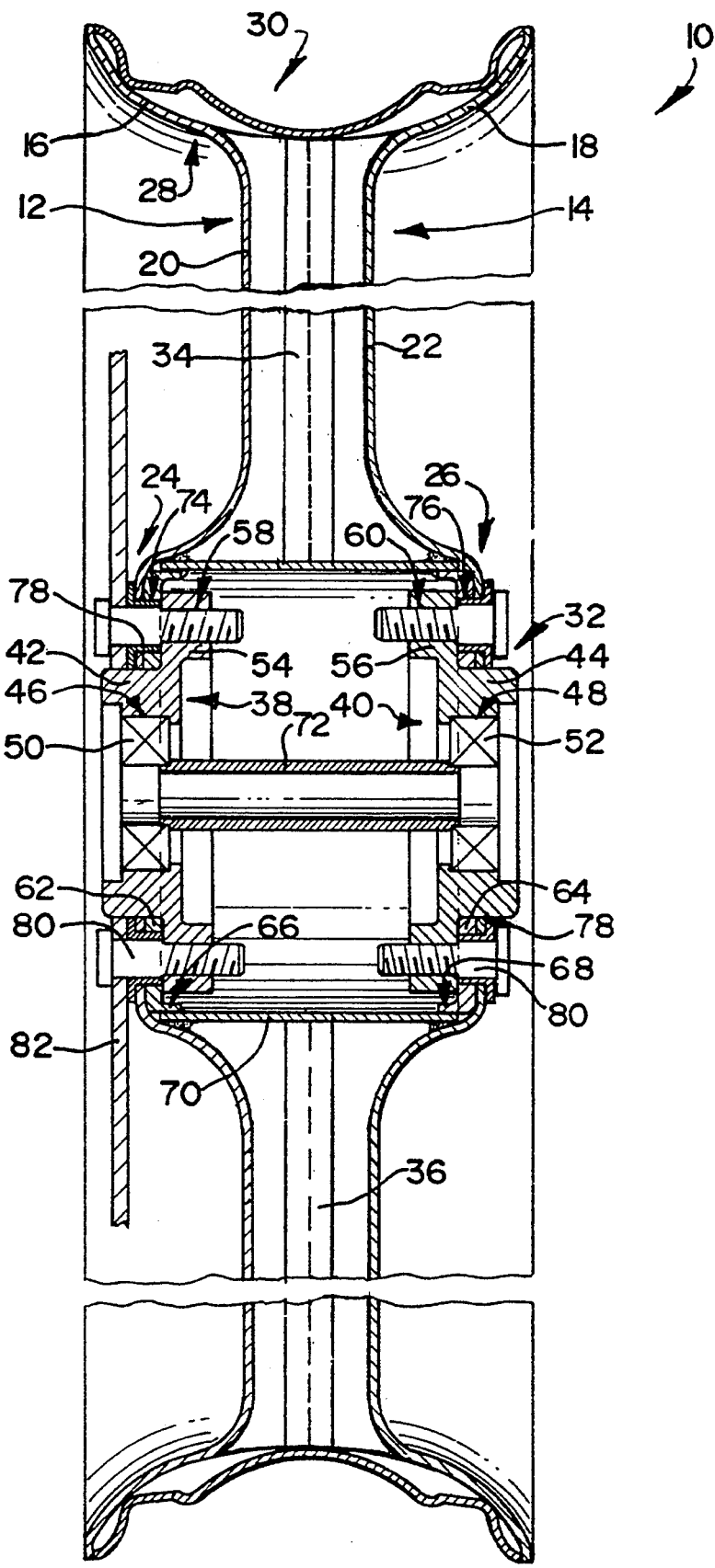
FIG. 2 shows a section taken at II—II in FIG. 1.

With reference to FIG. 2, each of the first and second members 12, 14 comprises a peripheral, concave band portion 16, 18, three spoke portions 20, 22 of concave section and extending inwardly from the respective band portions, and peripheral hub mounting formations 24, 26 at the radially inner ends of the spoke portions 20, 22.

The first and second members are shaped to be closable upon each other such that, in their closed condition, the band portions 16, 18 form a circular, peripheral, outwardly concave band 28 providing a seat within which a peripheral rim 30 is seated in use. A bottom or central hoop portion of the concave band 28 is interrupted at the positions of the spoke portions 20, 22.

The spoke portions 20, 22 form hollow, inwardly extending spokes.

The hub mounting formations 24, 26, in this embodiment, are respectively in the form of inwardly directed, disc-like flanges which are spaced a predetermined axial distance from each other when assembled.

The wheel frame 10 further comprises a hub generally indicated by reference numeral 32. In this embodiment, the hub 32 is pre-assembled prior to being assembled into the wheel frame. In another embodiment, hub components to form a hub may be assembled together with the other wheel frame components.

Figure 3:
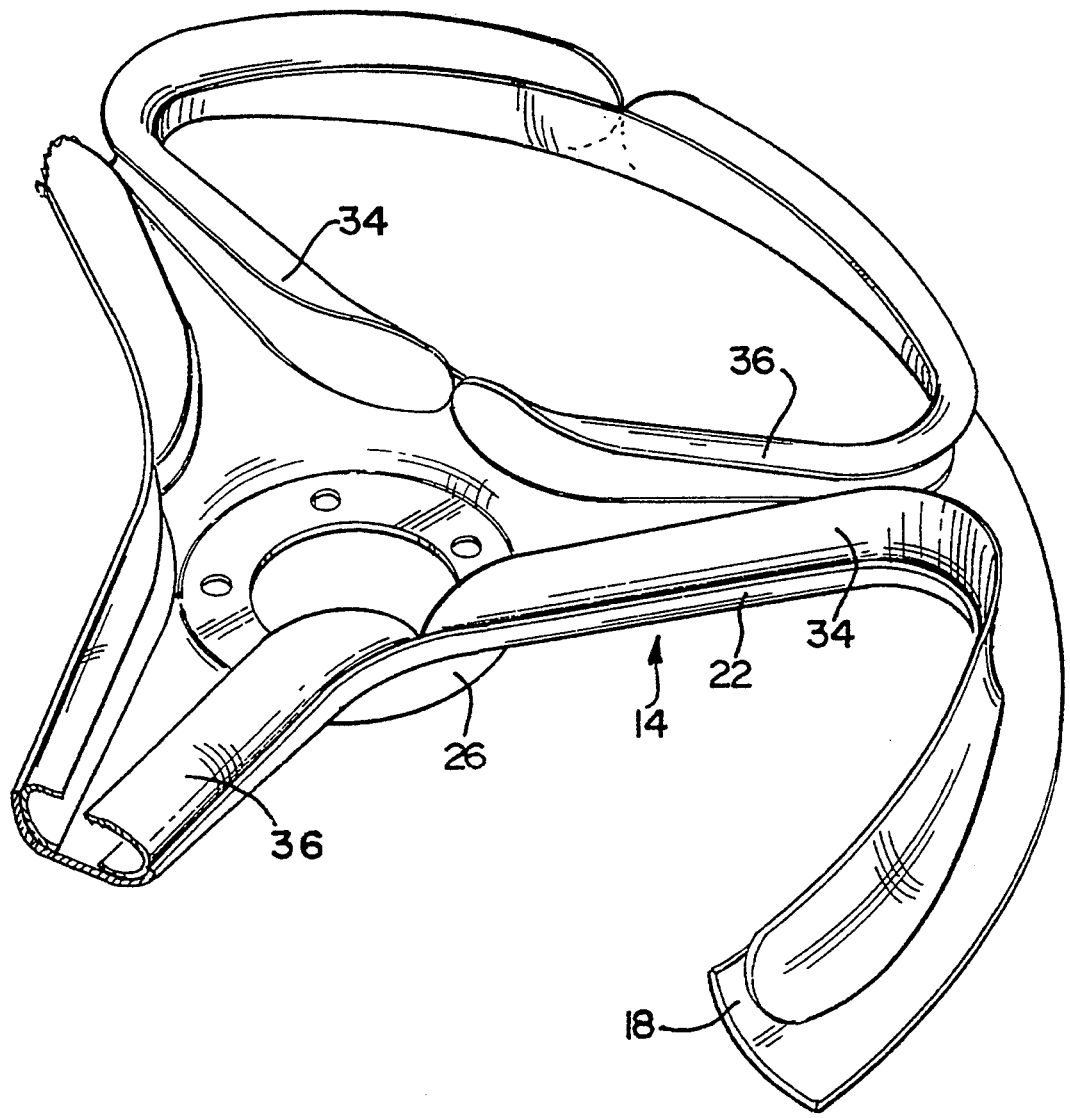
FIG. 3 shows, fragmentarily, in three dimensional view, internal lips positioned on a second member of the wheel frame of FIG. 1.

With reference also to FIG. 3, attachment of the first and second members 12, 14 is enhanced by the use of sets of internal lips 34, 36. It is to be appreciated that the first and second members each has an edge, the profile of which can easily be perceived from FIG. 1 and which is in a single plane which will correspond with a center of the wheel frame when assembled. Those edges interface during assembly. The lips 34, 36 are shaped, in conjunction, to surround a sector-like gap in the wheel frame intermediate adjacent spokes and the corresponding portion of the concave band. The lips overlap internally the edges of the first and second members and thus bridge such interface. The lips provide enlarged surface areas by means of which bonding to the first and second members takes place to enhance the integrity of the bond. Any convenient number of lips may be used to form a lip set. Thus, such a lip set may be integral in the form of an endless, profiled band.

Figure 5:
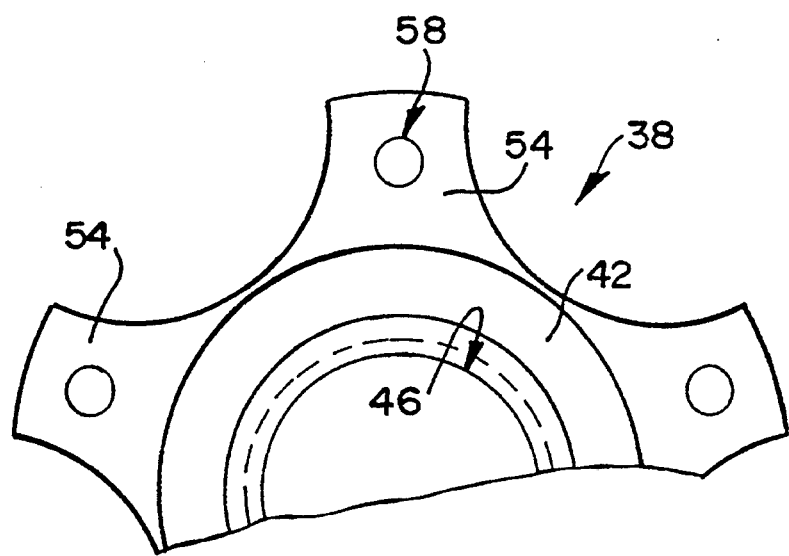
FIG. 5 shows, fragmentarily, to a larger scale, in frontal view, a spider of a hub of the wheel frame of FIG. 1.

With reference also to FIG. 5, the hub 32 comprises a pair of spiders or stars 38, 40 of light metal material such as aluminum or aluminum alloy. Each spider 38, 40 has a journal portion 42, 44 defining an internal circular cylindrical seat 46, 48 for wheel bearings 50, 52. Extending outwardly from the journal portions 42, 44, there are provided a number of radial projections 54, 56 which are inset as can be perceived from FIG. 2 from the journal portions. Through each radial projection there is provided a tapped aperture 58, 60.

Outwardly of the outer faces of the radial projections 54, 56, there is provided at each side of the hub 32 a disc 62, 64 which is bonded to said outer face of its spider. Each disc 62, 64 provides a peripheral seat 66, 68 on which a barrel 70 is seated. The barrel 70 is bonded to the seat formations 66, 68. Each disc 62, 64 has apertures in line with the apertures 58, 60 through the spiders. In a developed embodiment, the discs may be provided integrally with the first and second members 12, 14. They may then be provided by the hub mounting formations.

Figure 6:
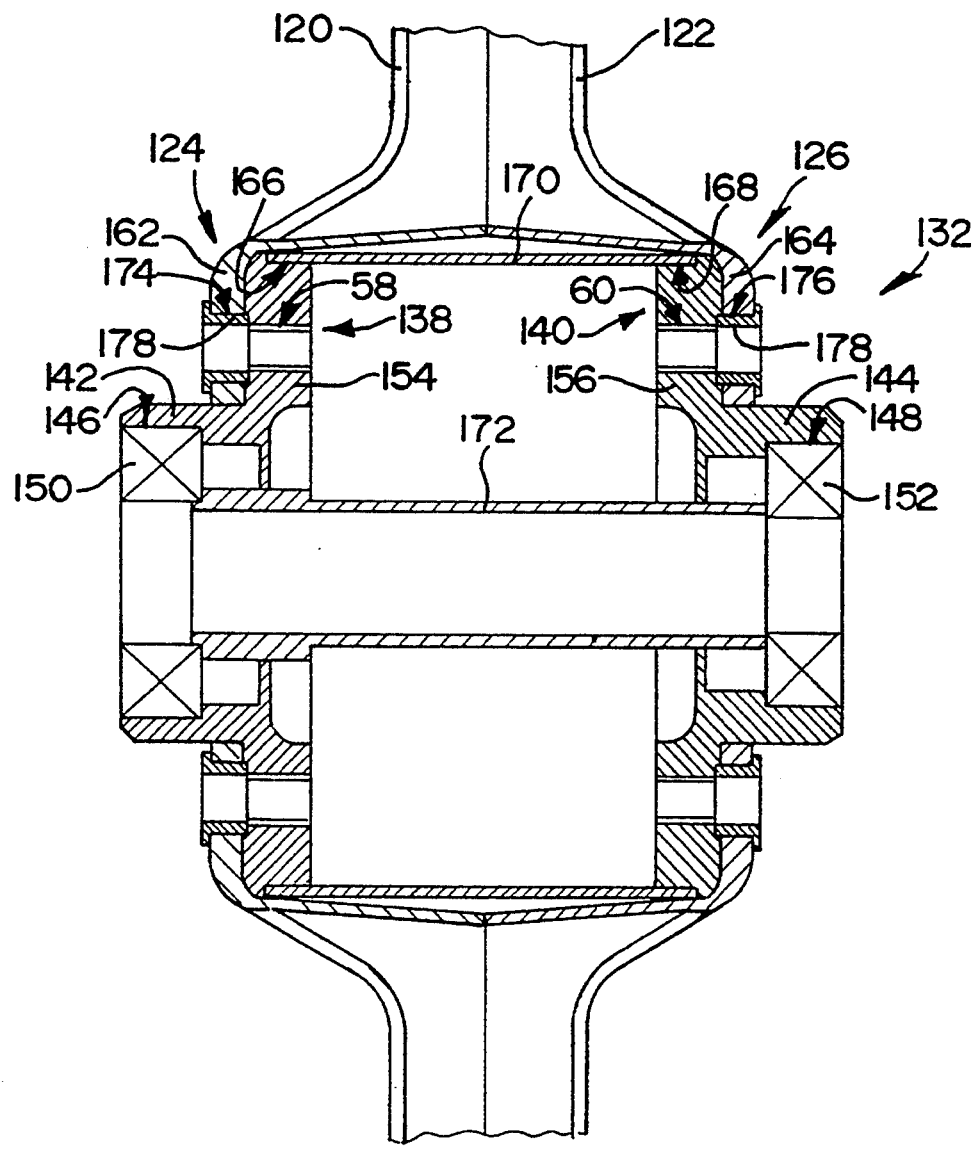
FIG. 6 shows, fragmentarily, to a slightly larger scale, in axial section, a slightly modified hub portion of a wheel frame in accordance with the invention.

With reference to FIG. 6, a slightly modified hub is generally indicated by reference numeral 132. In most respects, the hub 132 is very similar to the hub 32 of FIG. 2. Thus, the hub 132 is not again described in detail and like reference numerals refer to like components or like features. The slight modifications are merely highlighted.

The discs 162, 164 are integral with their respective first and second members 120, 122 and actually form hub mounting formations of the first and second members. In this embodiment, the discs 162 and 164 have wall thicknesses which are thicker than the general wall thicknesses of the first and second members.

The seats 166, 168 for the barrel 170 are provided in the form of peripheral rebates in the outer peripheries of the spiders 138, 140.

Assembly of the wheel frame 10 is now described in more detail with reference mainly to FIG. 2.

One of the first and second members, say the second member 14, is left in its mold. The hub 32 (which is preassembled in this embodiment) is positioned in and is bonded to the hub mounting means 26.

The lips 34, 36 are positioned within and are bonded to the second member 14.

The rim 30 is seated in the band portion 18 and is bonded to the band portion 18 as will be described in more detain with reference to FIG. 4.

The first member 12 is then fitted onto the subassembly. If fitting correctly, it is removed and bonding adhesive is applied prior to fitting it finally in position. It is to be appreciated that it is of the utmost importance that the first member 12 fits very well on the sub-assembly as bonding takes place "blind" and cannot be inspected afterwards.

Flanged bushes 78 are inserted into apertures 74, 76 provided respectively in register through the hub mounting formations 24, 26 and the discs 62, 64. The bushes 78 are of stainless steel, e.g. Stainless Steel 304, and serve to provide a hardened bearing surface for screw threaded bolts 80 screwed through the bushes 78 into the spiders 38, 40. The bolts 80 are used to screw components such as a sprocket, and brake discs such as a brake disc 82 to the hub 32.

A spacer 72 is provided to space the bearings 50, 52 appropriately.

Figure 4:
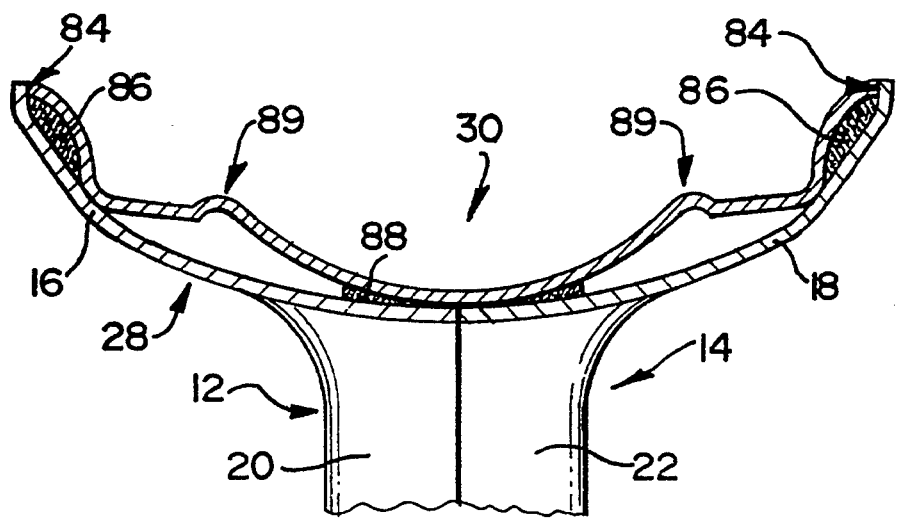
FIG. 4 shows, to a larger scale, a sectional view taken at IV—IV in FIG. 1.

With reference to FIG. 4, peripheral side edges of the rim 30 abut inner sides of the concave band 28 as shown at 84. A bottom or central portion of the rim 30 is seated on or is proximate a central hoop portion of the concave band 28. In those areas, as shown at 86 and 88, bonding is critical, as the combined stiffness of the concave band 28 and the rim 30 prevents the assembly from opening under parting forces due to inflation of the tire in use. It is to be appreciated that the rim 30 has a profile dissimilar to the profile of the band 28. The profile of the rim 30 is generally adapted and specifically form peripheral beads 89 to seat a tire, more specifically a tubeless tire. Furthermore, the rim 30 is of generally constant wall thickness. Thus, the wall of the rim 30 is generally spaced from the concave band 28 except in those areas where they are bonded. Such spacing increases the "area of inertia" thus the stiffness against bending and thus the integrity of seating the tire. The double skinned and interconnected arrangement of the rim assembly results in a very strong, yet lightweight construction.

Generally, where bonding surfaces cannot be inspected and where small gaps may be present, a foaming adhesive may be used.

It is an important advantage of the invention that a wheel frame, excluding the hub, is formed of three components, each of which is integrally molded, and furthermore that each of the first and second members incorporates a band portion (which forms part of the rim assembly comprising the concave band 28 and the rim 30), a spoke portion, and hub mounting means, Thus, at each side of the wheel frame, an integral member extends along the whole of the radial extent of the wheel frame.

In the rim assembly, the integral rim 30 extends around the periphery of the wheel frame and also across the width of the wheel frame.

Thus, bonding, which is in a way an unavoidable "evil", is positioned such that stresses in the main stress directions (radial stress, hoop stress, stress across the width of the tire seat) are transmitted over integral components and not solely across bonding lines. The wheel frame is thus of fail-safe construction in respect of failure of any bond, i.e. should any bond fail in use, the failure would not be catastrophic. This is a very important safety feature.

The provision of hollow spokes enhances the rigidity of the wheel frame.

The construction in accordance with the invention allows a wheel to be manufactured which has the advantages mentioned above, and which is lightweight, yet structurally strong and rigid as well as fail-safe in respect of failure of a bond.

The light mass of the wheel frame results in low unsprung mass which enhances the handling and stability of the motorcycle. Furthermore, because whichever metal components are used, are provided at the center of the wheel frame, mass is deconcentrated from the periphery. Thus, firstly, it lowers the moment of inertia of the wheel frame which is favorable for acceleration and braking. Secondly, it ameliorates the gyroscopic effect of the wheel frames which is favorable for the handling of the motor cycle through curves.

The enhanced rigidity improves handling and stability, especially under conditions of rapid change such as under hard acceleration, braking and negotiating curves. The lateral rigidity (e.g. on account of the hollow spokes) renders the wheel frame suitable also for vehicles undergoing lateral stresses such as sidecar motorcycles.

It is further an advantage of the embodiment illustrated that the hub can be assembled separately from its components prior to being assembled into the wheel frame. During assembly into the wheel frame, it is embraced by the hub mounting means, thus providing large bonding areas, to integrate the hub into the wheel frame structure.

The manner in which the components are split causes only a single joint—along the center of the wheel—to be at a position which is visible and aesthetically important when the wheel is in use. This joint is planar, is easily accessible, and can thus be well formed to ensure that it closes well during assembly and can easily be finished if desired after assembly. The construction of the wheel frame is thus conducive to a neat and well finished appearance.

We claim:

1. A motor vehicle wheel frame comprising
   complemental first and second members, each being of separate, integrally molded, construction of fiber-reinforced synthetic plastics material and comprising
   an outer, circular, band portion,
   a plurality of spoke portions respectively of concave section, and integral with and extending inwardly from the band portion,
   hub mounting formations at inner ends of the spoke portions, the first and second members being closed upon and bonded to each other in opposite oriented arrangement such as to form an outer, circular, outwardly concave band, a plurality of hollow spokes and such as to position the hub mounting formations oppositely to each other;
   a molded, integral, circular rim of fiber-reinforced synthetic plastics material seated in and bonded to said outwardly concave band and providing a radially outwardly exposed seat adapted to seat a tire in use; and
   hub components forming a hub and which are seated in and secured to the hub mounting formations in which said outer, circular, outwardly concave band has a wall of generally constant thickness and which wall has a radially inner surface and a radially outer surface, said radially inner surface, along portions intermediate said hollow spokes, as viewed in cross section, being of continuous convex shape, in which said molded, integral, circular rim has a wall of generally constant thickness and which wall has a radially inner surface and a radially outer surface, said radially outer surface providing said radially outwardly exposed seat, said radially inner surface, as viewed in cross section, being of undulating shape having portions of convex shape and portions of concave shape, said radially outer surface of said outer, circular, outwardly concave band and said radially inner surface of said molded, integral, circular rim, when seen in cross section, touching at predetermined spaced positions only, and being spaced apart intermediate said predetermined spaced positions, bonding of said rim to said band being along said predetermined spaced positions only.

2. A wheel frame as claimed in claim 1 in which a major portion of said radially inner surface of continuous convex shape is substantially part circular.

3. A motor vehicle wheel frame comprising
complemental first and second members, each being of separate, integrally molded, construction of fiber-reinforced synthetic plastics material and comprising
an outer, circular, band portion,
a plurality of spoke portions respectively of concave section, and integral with and extending inwardly from the band portion,
hub mounting formations at inner ends of the spoke portions, the first and second members being closed upon and bonded to each other in oppositely oriented arrangement such as to form an outer, circular, outwardly concave band, a plurality of hollow spokes and such as to position the hub mounting formations oppositely to each other;
a molded, integral, circular rim of fiber-reinforced synthetic plastics material seated in and bonded to said outwardly concave band and adapted to seat a tire in use; and
hub components forming a hub and which are seated in and bonded to the hub mounting formations, the components forming a hub comprising opposed side flanges forming sides of the hub and providing seats for wheel bearings, and a barrel interconnecting the side flanges, the barrel being in the form of a molding or extrusion of synthetic plastics material, discs being provided co-axially adjacent to and bonded to the side flanges and providing peripheral seats on which ends of the barrel are seated and bonded.

4. A wheel frame as claimed in claim 3 in which the discs are of a synthetic plastics material, and are apertured in register with the apertures of the flanges, bushes being provided in said apertures of the discs.

5. A wheel frame as claimed in claim 4 in which the discs are provided integrally with respectively the first and second members and form the or form part of the hub mounting formations.

6. A wheel frame as claimed in claim 4 in which the discs are separate and are included in the components forming the hub.

7. A wheel frame comprising
complemental first and second members, each being of separate, integrally molded, construction of fiber-reinforced synthetic plastics material and comprising
an outer, circular, band portion,
a plurality of spoke portions respectively of concave section, and integral with and extending inwardly from the band portion,
hub mounting formations at inner ends of the spoke portions, the first and second members being closed upon and bonded to each other in oppositely oriented arrangement such as to form an outer, circular, outwardly concave band, a plurality of hollow spokes and such as to position the hub mounting formations oppositely to each other;
a molded integral, circular rim of fiber-reinforced synthetic plastics material seated in and bonded to said outwardly concave band and adapted to seat a tire in use; and
hub components forming a hub and which are seated in and secured to the hub mounting formations, the components forming a hub comprising opposed side flanges forming sides of the hub and providing seats for wheel bearings, and a barrel interconnecting the side flanges, the barrel being in the form of a molding or extrusion of synthetic plastics material, discs being provided co-axially adjacent to and secured to the side flanges and providing peripheral seats on which ends of the barrel are seated and bonded.

8. A wheel frame as claimed in claim 7 in which the discs are of a synthetic plastics material, and are apertured in register with the apertures of the flanges, bushes being provided in said apertures of the discs.

9. A wheel frame as claimed in claim 8 in which the discs are provided integrally with respectively the first and second members and form the or form part of the hub mounting formations.

10. A wheel frame as claimed in claim 8 in which the discs are separate and are included in the components forming the hub.

* * * * *